United States Patent
Röwekämper et al.

(10) Patent No.: US 10,444,332 B2
(45) Date of Patent: Oct. 15, 2019

(54) METHOD AND SYSTEM FOR CALIBRATING A NETWORK OF MULTIPLE HORIZONTALLY SCANNING RANGE FINDERS

(71) Applicant: Albert-Ludwigs-Universität Freiburg, Freiburg (DE)

(72) Inventors: Jörg Röwekämper, Kenzingen (DE); Michael Ruhnke, Denzlingen (DE); Bastian Steder, Au im Breisgau (DE); Gian Diego Tipaldi, Freiburg (DE); Wolfram Burgard, Denzlingen (DE)

(73) Assignee: ALBERT-LUDWIGS-UNIVERSITÄT FREIBURG, Freiburg (DE)

( * ) Notice: Subject to any disclaimer, the term of this patent is extended or adjusted under 35 U.S.C. 154(b) by 199 days.

(21) Appl. No.: 15/559,208

(22) PCT Filed: Mar. 17, 2016

(86) PCT No.: PCT/EP2016/055771
§ 371 (c)(1),
(2) Date: Sep. 18, 2017

(87) PCT Pub. No.: WO2016/146728
PCT Pub. Date: Sep. 22, 2016

(65) Prior Publication Data
US 2018/0067199 A1    Mar. 8, 2018

(30) Foreign Application Priority Data
Mar. 19, 2015  (EP) .................. 15159857

(51) Int. Cl.
*G01C 3/08* (2006.01)
*G01S 7/497* (2006.01)
(Continued)

(52) U.S. Cl.
CPC .......... *G01S 7/4972* (2013.01); *G01S 7/4808* (2013.01); *G01S 17/42* (2013.01); *G01S 17/87* (2013.01)

(58) Field of Classification Search
CPC ...... G01S 7/4972; G01S 7/4808; G01S 17/42; G01S 17/87
See application file for complete search history.

(56) References Cited

U.S. PATENT DOCUMENTS

| | | | |
|---|---|---|---|
| 7,650,239 B2* | 1/2010 | Samukawa | G01S 17/42 180/169 |
| 2015/0124242 A1* | 5/2015 | Pierce | A01D 34/008 356/5.01 |
| 2016/0223652 A1* | 8/2016 | Bosse | G01S 17/42 |

OTHER PUBLICATIONS

Bok, Y., et al., "Extrinsic Calibration of Non-overlapping Camera-Laser System using Structured Environment," 2014 IEEE/RSJ International Conference on Intelligent Robots and Systems, IEEE, Sep. 14, 2014, pp. 436-443.
(Continued)

*Primary Examiner* — Samantha K Abraham
(74) *Attorney, Agent, or Firm* — Slater Matsil, LLP

(57) ABSTRACT

A method and a system for calibrating a network of multiple range finders are disclosed. In an embodiment, the method includes performing a measurement with the range finders during a movement of an object through an area covered by the network, identifying, for each range finder, data sets of the measurement associated with the moving object, based on a static analysis of the respective range finder, determining, for each pair of overlapping range finders, an estimated relative transformation between respective poses of the pair, based on the identified data sets of the pair, determining an initial maximum likelihood configuration of poses of all of the range finders based on the estimated relative transformations of each pair and iteratively determining sets of point
(Continued)

correspondences of the identified data sets and if a distance of the points in the pair is below a threshold, the threshold being redefined decreasingly for each iteration.

20 Claims, 3 Drawing Sheets

(51) Int. Cl.
     *G01S 17/42*      (2006.01)
     *G01S 17/87*      (2006.01)
     *G01S 7/48*       (2006.01)

(56) References Cited

OTHER PUBLICATIONS

Fernandez-Moral, E., et al., "Extrinsic calibration of a set of range cameras in 5 seconds without pattern," 2014 IEEE/RSJ International Conference on Intelligent Robots and Systems, Sep. 14, 2014, pp. 429-435.

Fernandez-Moral, E., et al., "Extrinsic calibration of 2D laser rangefinders from perpendicular plane observations," The International Journal of Robotics Research, Mar. 17, 2015, pp. 1-20.

Röwekämper, J., et al., "Automatic Extrinsic Calibration of Multiple Laser Range Sensors with Little Overlap," 2015 IEEE International Conference on Robotics and Automation (ICRA), May 1, 2015, pp. 2072-2077.

\* cited by examiner

METHOD AND SYSTEM FOR CALIBRATING A NETWORK OF MULTIPLE HORIZONTALLY SCANNING RANGE FINDERS

This patent application is a national phase filing under section 371 of PCT/EP2016/055771, filed Mar. 17, 2016, which claims the priority of European patent application 15159857.0, filed Mar. 19, 2015, each of which is incorporated herein by reference in its entirety.

TECHNICAL FIELD

The present disclosure relates to the topic of calibration of a network of multiple horizontally scanning range finders, in particular laser range finders, wherein each of the range finders has an overlap with at least one of the other range finders.

BACKGROUND

Networks of range finders are a popular tool for monitoring large cluttered areas and for tracking people. Whenever multiple scanners are used for this purpose, one major challenge is how to determine the relative positions of all of the scanners.

Range finders, in particular laser range finders, are widely used sensors in robotics and in industry. Applications typically include the task of acquiring spatial information about the environment, of avoiding obstacles, of building maps or to localize a mobile robot in a map, to name only a few. Furthermore, they have been used to track people, to monitor areas or to implement safety zones, i.e., to detect humans and switch off dangerous machines when the humans are too close.

For the task of surveying a larger area, typically a network of multiple range finders is necessary. At the same time, efforts are made to minimize the number of sensors in the network for economic reasons. This can lead to the reduction of the overlap between the visible areas of the individual range finders.

Calibrating such a sensor network can be tedious, especially when the overlap between the visible areas of the individual scanners is small. In some conventional calibration algorithms, predefined patterns or calibration aids are used. Such calibration patterns may improve the data association between individual observations. However, such calibration patterns may not be helpful if the range finders to be calibrated do not perform a visual measurement.

SUMMARY OF THE INVENTION

Embodiments of the present disclosure provide an improved concept for the calibration of a network of multiple horizontally scanning range finders that can be used with reduced effort.

Embodiments of the improved concept are intended to be used with a network of two or more horizontally scanning range finders like laser range finders. However, the improved concept can also be used with other kinds of range finders such as ultrasonic range finders or radar-based range finders. For example, all of the range finders are of the same scanning type, e.g., laser range finders, ultrasonic range finders or radar-based range finders. However, also combinations of different range finder types are possible, if they, e.g., provide similar output signal formats. Furthermore, preferably the range finders are of a two-dimensional range finder type. The range finders to be calibrated at least have an overlapping scanning range respectively visible area with one of the other range finders such that a greater area can be observed with the network of range finders, in particular a contiguous area that is constructed from the individual visible areas respectively scanning ranges of each of the range finders. It should be apparent, that the range finders are stationary both during calibration and during actual, productive use of the calibrated network of range finders.

Embodiments of the improved concept are based on the idea that measurements relating to an object moving through the area covered by the network of range finders during a calibration phase are used as a basis for determining a spatial relationship between the individual range finders. In particular, based on a static analysis of each range finder, measurements are identified that can be associated with the moving object. Based on these identified measurements, relative transformations between poses of overlapping pairs of the range finders are determined. A global initial guess of all poses of the range finders is determined from said estimated relative transformations. The global initial guess is used for defining an optimization problem taking into account the measurements relating to the moving object described above. The optimization is performed iteratively until a convergence criterion is reached. As a result, the relative poses of all of the range finders are found, allowing, e.g., the transformation of measurements of all of the range finders into a single coordinate system.

Various convergence criterions are well known in the art of optimization techniques and will therefore not be described in more detail here. To give some non-limiting examples here, a convergence criterion could be that a change of a residual error in a previous iteration is below a threshold or that a change of an estimated parameter in the previous iteration is below a threshold. Further convergence criterions could be a maximum number of iterations or a maximum time of optimization.

Optionally, the results of the iterative optimization can be refined, taking into account the static analysis of each of the range finders.

The calibration according to the improved concept does not need any special calibration patterns or execution of predefined measurements. Instead, it is sufficient if an arbitrary object moving through the observed area is measured. Moreover, the object can move through the area on an arbitrary route, as long as each sensor of the network of range finders is able to detect the moving object at some time of the calibration measurement. It is particularly not necessary that the moving object is present in the scanning range of each range finder all the time during the measurement. Furthermore, no camera images are needed or employed in the calibration according to the improved concept.

In an embodiment of a method for calibrating a network of multiple horizontally scanning range finders according to the improved concept, a measurement is performed with the range finders during movement of an object through an area covered by the network of range finders. For each of the range finders, data sets of the measurement associated with the moving object are identified, based on a static analysis of the respective range finder. For each pair of overlapping range finders, i.e., range finders having an overlapping scanning range, out of the network of range finders, an estimated relative transformation between respective poses of the range finders of this pair is determined, based on the identified data sets of the range finders of this pair. For example, each pose defines a translation in a two-dimensional coordinate system together with a rotational component, related in particular to the origin and orientation of a common coordinate system.

According to the improved concept, an initial maximum likelihood configuration of poses of all of the range finders of the network is determined based on the estimated relative transformations of each pair. In an iterative fashion with multiple iteration steps, sets of point correspondences out of the identified data sets are determined. In this determination, each point correspondence is defined between points in each of the pairs of overlapping range finders, if a distance of said points in said pair is below a threshold. The threshold is redefined decreasingly for each of the iteration steps. Furthermore in the iteration, a maximum likelihood configuration of poses of all of the range finders of the network is determined based on the sets of point correspondences determined for the present iteration step and on the maximum likelihood configuration determined in the previous iteration step. At the beginning of the iterations, i.e., in a first iteration step, the initial maximum likelihood configuration is used instead of the configuration of the previous iteration step. The iteration is continued until a convergence criterion is reached.

The static analysis may be performed in an initialization phase for each range finder, in particular after each of the range finders is fixedly installed regarding its position and orientation. For example, during the static analysis a static part of the environment may be estimated using background subtraction techniques known in the art. For example, the background environment may be formed of walls, furniture or other static obstacles.

The final result of the calibration method, namely the configuration of poses of all of the range finders of the network, can be used during normal operation of the range finder network, such that all measurements performed by the individual range finders can be projected in a common coordinate system of the network. For example, a map of the area covered by the network of range finders can be constructed using the result of the calibration method, allowing the determination of a position of any moving or still object within the covered area.

In some implementations according to the improved concept, the estimated relative transformation is determined with a Random Sample Consensus, RANSAC, based algorithm for each pair of overlapping range finders.

For example, in some implementations the estimated relative transformation is determined for each pair of overlapping range finders by an iterative process. In particular, in such an iterative process a hypothetic relative transformation is calculated based on one of the identified data sets each of this pair at a given time instance. For example, the hypothetic relative transformation defines a transformation of one identified point of a first range finder of this pair to one identified point of the second range finder of this pair. The two points, respectively the two identified data sets of the pair, may be chosen arbitrarily. The calculated hypothetic relative transformation is applied on the remaining identified data sets at the given time instance. The number of data sets fulfilling a threshold error condition after application of the calculated hypothetic relative transformation is counted. For example, such a threshold error condition may be fulfilled if the distance between the transformed point and its nearest neighbour in the system of the other range finder is below a specified threshold. Such data sets fulfilling the condition may be called "inliers" because they can be found within the given threshold bounds.

The calculation and application of the hypothetic relative transformation is repeated for a large number or all possible combinations of data sets, for example.

The hypothetic relative transformation with the highest counted number is used as the estimated relative transformation.

It may be expedient to determine, whether a pair of range finders has an overlap of their visual areas. For example, this may be done by deciding whether measurements relating to the moving object occur at the same time instances of the two range finders under examination. In addition or as an alternative, a pair may be decided to have an overlap, (only) if a certain number of "inliers" is counted through all iterations. Other decision rules are possible too.

In some implementations of the method according to the improved concept, the initial maximum likelihood configuration of poses is determined by minimizing a cost function. The cost function is defined by a pose difference of poses of each one of the pair of range finders in relation to the estimated relative transformation of that pair.

For example, the initial maximum likelihood configuration is used as an initial guess for performing the iterative optimization in the following steps, where also the point correspondences are taken into account.

In some specific implementations determining the initial maximum likelihood configuration of poses further comprises weighting of the cost function based on a quality measure determined during determination of the estimated relative transformation. For example, the results and/or side products of the determination of the estimated relative transformation can be used for forming the quality measure. In particular, during the determination of the estimated relative transformation a quality measure can be found that represent certainty respectively uncertainty of said estimation. For example, if a higher number of inliers is found, for example, because there is a larger overlap of the respective range finders, there may be a high quality of the estimation. In contrast, if the highest number of data sets fulfilling the threshold error condition is relatively low, the quality of the estimation may be regarded as poor. Hence, the quality measure may be formed as a measure of confidence from a statistical point of view. As a consequence, estimated relative transformations having more support from, e.g., their inlier set may have a higher weight during the determination of the initial maximum likelihood configuration of poses.

For example, the cost function is minimized based on a least squares approach. However, other error minimization techniques may also be applied.

With respect to the determination of sets of point correspondences, in some implementations the distance of said points in said pair of range finders is defined as an Euclidian distance of points in a coordinate system common to said pair.

Furthermore, the determination of the sets of point correspondences may further comprise the calculation of an angular orientation of each point. In such a case the distance of said points in said pair of range finders may be further defined by an angular distance of orientation of said points. For example, the angular orientation may be calculated by computing a local surface approximation for each point and storing the corresponding normal direction of that surface. The inclusion of angular distances may prevent the identification of a point correspondence if the moving object is scanned, e.g., from more or less opposite directions.

In various implementations of the method according to the improved concept, for each of the iteration steps, the maximum likelihood configuration of poses is determined by minimizing a cost function. Said cost function that is different from a cost function possibly used during determination of the initial maximum likelihood configuration is defined by a re-projection error in a projection of the point correspondences determined for the present iteration step. Said cost function is further a function of either the maximum likelihood configuration of poses determined in the previous iteration step or, in a first iteration step, on the initial maximum likelihood configuration.

Similar to the minimization of the cost function during determination of the initial maximum likelihood configuration, also the iteratively applied cost function may be weighted based on a quality measure determined during determination of the estimated relative transformation. For example, results of statistical confidence can be included in the quality measure. Furthermore, also the distance of the sets of determined point correspondences may be used as a quality measure, such that smaller distances have a higher weight.

Also in the latter case, the minimization of the cost function may be based on a least squares approach or on other optimization techniques.

In some implementations also a time offset of each of the range finders may be included during calibration. For example, a time for transmitting measurement data from the range finder to a common processing unit may differ depending on the physical or logical transmission scheme. For example, range finders connected by a network connection like Ethernet may have different transmission times compared to a range finder connected via a serial or USB connection.

Such transmission times or time offsets may be taken into account by employing velocity vectors of respective points in the data sets. For example, determining the sets of point correspondences may further comprise calculating a velocity vector of each point, wherein the distance of said points in said pair of range finders is further defined by a time distance of said points. The time distance is determined based on the respective velocity vectors.

Preferably, when time offsets should be taken into account, the iterative procedure of determining maximum likelihood configurations also includes the common determination of a maximum likelihood configuration of time offsets of all of the range finders of the network for each of the iteration steps. In such an implementation, the maximum likelihood configuration of poses and time offsets is determined by minimizing a cost function, which is defined by a re-projection error in a projection of the point correspondences determined for the present iteration step. The projection is performed as a function of either the maximum likelihood configuration of poses and time offsets determined in the previous iteration step or, in a first iteration step, on the initial maximum likelihood configuration. The optional application of a quality measure as a weight for the cost function also applies in such an implementation.

In some implementations, after the iterative optimization has converged, the maximum likelihood configuration determined in the last iteration step may be further refined based on the static analysis of the range finders. Hence, in addition to the calibration based on the moving object, the final calibrated configuration of poses and, optionally, time offsets, may further be optimized based on measurements resulting from a static background.

In some implementations, as a further optional step, a consistency check can be performed that provides a measure for a user of the calibration, how consistent the results of the calibration method are to be assumed.

According to the improved concept also a calibration system for a network of multiple horizontally scanning range finders as described above is provided. The calibration system comprises a processing unit that is designed to perform the various steps of the calibration method described above. In particular, the processing unit is designed for carrying out any of the various combinations of implementations of the calibration method described above.

For example, the processing unit may have interfaces for connecting the range finders, a memory for storing the measurement data and interfaces for providing output of the processed data. For example, the processing unit comprises visualization means like a display or a graphics adaptor for providing a graphical representation of the measurement results.

The calibration system may provide the results of the calibration method, e.g., the configuration of poses and/or time offsets, to a further system that is used during normal operation of the network of range finders. However, it is also possible that the calibration system is equipped for performing the normal operation with the network of range finders.

BRIEF DESCRIPTION OF THE DRAWINGS

The text below explains the invention in detail using exemplary embodiments with reference to the drawings. Same references are used for same elements or elements having a similar function in the various figures. Hence, the description of elements in one figure is not necessarily repeated in all of the following figures.

In the drawings.

DETAILED DESCRIPTION OF ILLUSTRATIVE EMBODIMENTS

In the following a novel approach according to an improved concept to calibrate a network of multiple horizontally scanning 2D range finders with limited overlap is presented. This approach is particularly useful but not limited to the application with laser range finders. Networks of range finders are a popular tool for, e.g., monitoring large cluttered areas or to track people. Whenever multiple range finders are used for this purpose, how to determine the relative positions of all of the range finders is challenging. It is assumed that each of the range finders has a planar scanning area and is scanning horizontally. Usually such range finders have a limited angular range or visual area.

Figure 1:
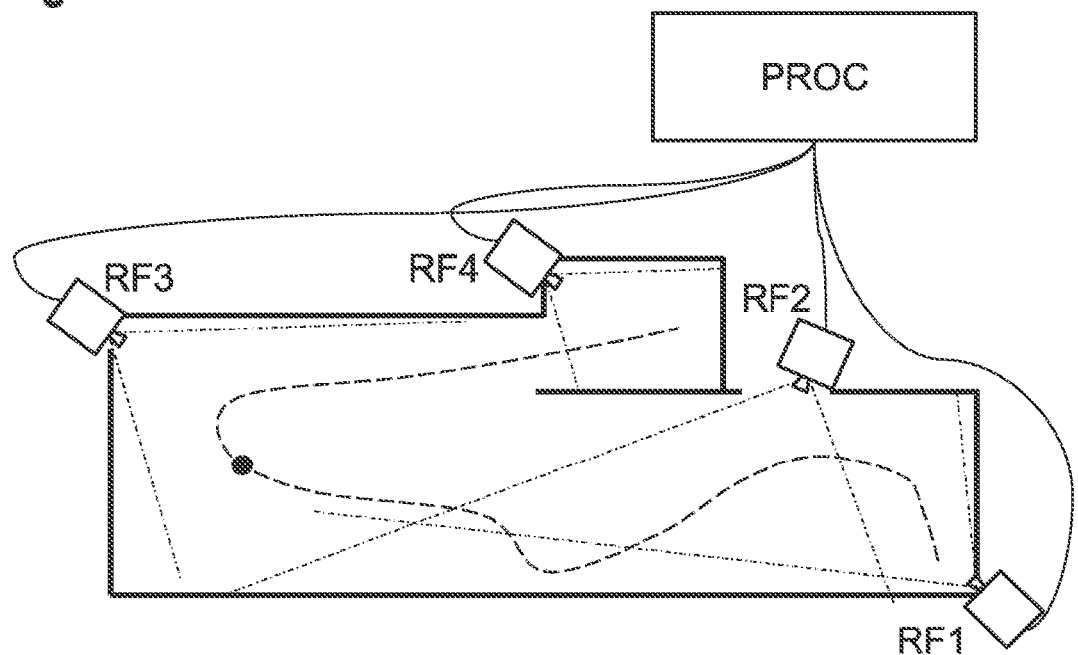
FIG. 1 shows an example embodiment of a network of range finders connected to a processing unit.

FIG. 1 shows an example setup with four range finders RF1, RF2, RF3, RF4, and a scanning area limited by static obstacles, such as, e.g., walls, shelves or the like. The four range finders are connected to a processing unit PROC that receives the measurement data from the range finders RF1 to RF4. The number of range finders in this example setup is arbitrarily chosen to be four, however could also be two, three or any value greater than four. In practical implementations the number may only be limited by the processing capabilities of the processing unit block.

Each of the range finders RF1 to RF4, has a defined scanning range, in particular defined angular range, which is indicated in FIG. 1 by the respective dash-dotted lines. As can be seen from FIG. 1, each of the range finders RF1 to RF4, has an overlap with at least one of the other range finders. In this particular example, the range finder RF1 has an overlap with the range finders RF2 and RF3, same as the range finder RF2 with the range finders RF1 and RF3. In contrast, range finder RF4, only has an overlap with range finder RF3. In summary, a contiguous area can be formed of the scanning ranges of the four range finders RF1 to RF4. For a combined operation of the network of range finders RF1 to RF4, it is expedient to know the relative positions of the range finders.

Figure 2:
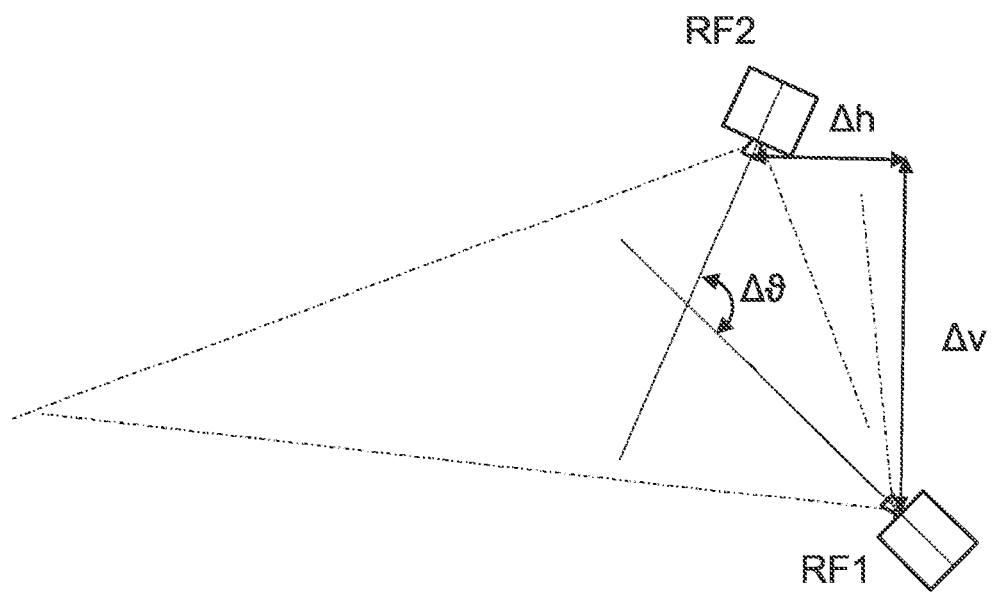
FIG. 2 shows a simplified block diagram of two range finders and their spatial relationship.

Referring now to FIG. 2, an example configuration of two of the range finders RF1, RF2 is depicted. In particular the range finders RF1, RF2 have a relative translation defined by a horizontal offset $\Delta h$ and a vertical offset $\Delta v$. Furthermore, their main viewing angle is rotated by an angular offset $\Delta \theta$. Hence, if an object, assumed as a point, is detected by both range finders RF1, RF2, a respective viewing angle and viewing distance may be transformed from a coordinate system of one of the range finders to the coordinate system of the other range finder by a respective transformation, if the exact position and orientation, which can also be called a pose, of the range finders are known with a high degree of exactness.

Referring back to FIG. 1, if multiple range finders are employed in a network, a common coordinate system may be looked for in order to, e.g., create a single map of the observed area allowing an exact positioning of objects within the map. For example, one of the range finders, that can be arbitrarily chosen, is used as a reference for the common coordinate system, thus having a pose with theoretical offsets of o.

The calibration of the network of range finders is performed by formulating an extrinsic calibration problem as a joint maximum likelihood estimation problem, in which the extrinsic parameters, e.g., poses, of all of the range finders are jointly estimated. During such optimization it is aimed to minimize the re-projection error of corresponding measurements from all range finder pairs and all time stamps. In view of the challenge of gauge freedom and non-observability of the whole system, one range finder is fixed to stay at the center of a global reference frame, as described above.

According to the improved concept, it is not relied on any predefined calibration pattern but, instead, a valid initial guess for the non-linear optimization problem is automatically computed exploiting measurements relating to an object moving through the observed area of the network. The approach according to the improved concept is applicable to any type of two-dimensional range finder, in particular a laser range finder. A specific resolution, frequency or field of view is not required. In various implementations the network of range finders can contain different types of range finders. Preferably the range finders are mounted horizontally and provide consistent time stamps for their measurements.

Figure 3:
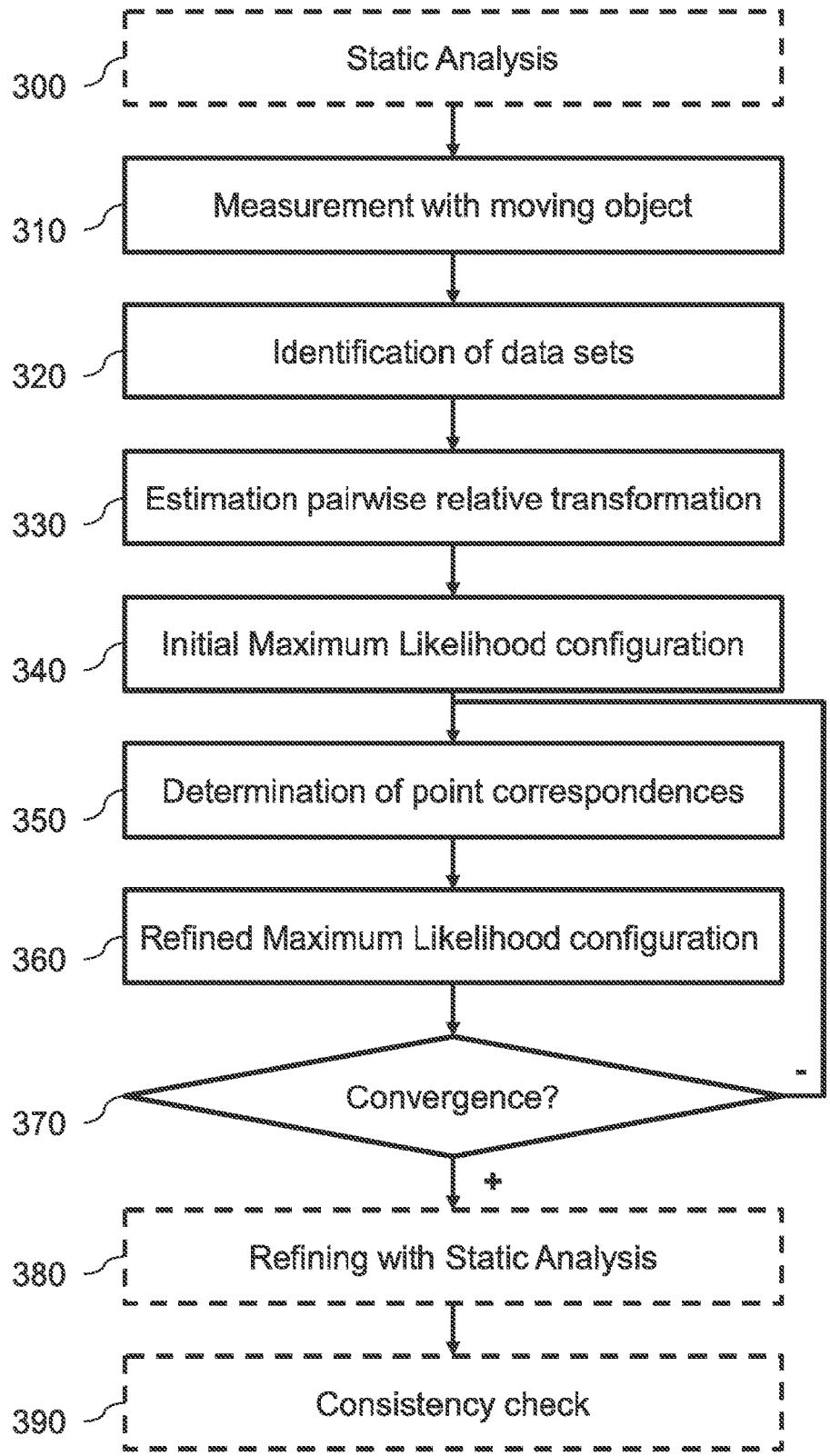
FIG. 3 shows a flowchart of an embodiment of a calibration method according to the improved concept.
Figure 4:
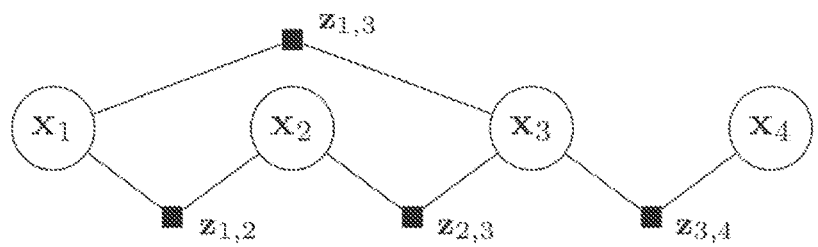
FIG. 4 shows an example factor graph.

Referring now to FIG. 3, an example flowchart of a calibration process of a network of multiple horizontally scanning range finders is shown.

In block 300, acting as an initialization phase, a static analysis of the environment is performed for each of the range finders. For example, for each range finder, the static part of the environment is estimated using background subtraction techniques, which are known in the art. The static analysis of block 300 can be performed independently of the actual calibration method, as long as the results are still valid during actual calibration measurements. Hence, this block is shown with a dashed line as being optional.

In block 310 a measurement is performed with the range finders during a measurement period, when an object moves through an area covered by the network of range finders. Referring back to FIG. 1, the movement of such an object is shown as a dashed line going through the individual scanning areas of the example range finders RF1 to RF4. The moving object is indicated as a black dot. According to the improved concept, neither the exact course of the moving object nor the type of moving object is crucial for the application of the calibration measurement. Instead, the actual course can be chosen arbitrarily, in particular by the moving object, which can also be a person, as long as the course leads through the scanning range of each of the range finders of the network. In some implementations it is also possible to use more than one moving object concurrently.

Referring again to FIG. 3, block 320 relates to the identification of data sets of the measurement associated with the moving object for each of the range finders of the network. Such identification is performed based on the static analysis of the respective range finder. For example, the learnt background of each range finder is exploited to identify the measurements belonging to the moving object. In the following, these measurements belonging to the moving object form the basis of the calibration, respectively optimization, of the overall system.

In block 330 a pair-wise relative transformation between overlapping laser range finders is computed based on the dynamic range measurements introduced by the moving object. In particular, for each of overlapping range finders, i.e., range finders having an overlapping scanning range, out of the network of range finders, an estimated relative transformation between respective poses of the range finders of this pair is determined. This determination is based on the identified data sets of the range finders of this pair. For example, the determination is performed with a Random Sample Consensus, RANSAC, based algorithm for each pair of overlapping range finders.

For example, for each range finder the set of measurements belonging to the moving object is collected and stored together with their time stamps. Let $P_i=\{_{i,q}^t\}$ be the set of measured points of the range finder i where $p_{i,q}^t$ is the q-th point recorded at time t. Let $T_{i,j}=\{t\}$ be the set of time stamps in which the range finders i and j have observed the moving object at a time t. Preferably, the time t is the same for both range finders. However, in practice there may always be some difference in the time stamps. Hence, in the following two time stamps are considered equal if they differ by less than half of a period between two scans, for example, such a difference may be 10 ms for a frequency of 50 Hz.

For each pair of range finders i and j, the minimal hypothesis set is sampled in a two-stage process. At first a time instance t from the set $T_{i,j}$ is sampled. Then two random points from each set $P_i$ and $P_j$ recorded at time t are sampled. After calculating an initial transformation from these two correspondences, the hypothetic relative transformation is applied on the remaining identified data sets at a given time instance. The number of data sets fulfilling a threshold error condition after application of the calculated hypothetic relative transformation is counted. Such data sets fulfilling the threshold error condition may be called "inliers". For example, a point or data set is considered an inlier if the distance between the point and its nearest neighbor in the scan of the other range finder is below a specified threshold according to the calculated hypothetic relative transformation. This process is repeated iteratively multiple times. In the end the hypothetic relative transformation with the highest counted number is used as the estimated relative transformations for the range finder pair under consideration.

Preferably the use of data sets that do not belong to the measurements of the moving object is avoided.

In the following block 340 an initial maximum likelihood configuration of poses of all of the range finders of the network based on the estimated relative transformation of each pair is determined. If only a network of two range finders is to be calibrated, the poses can be calculated straightforwardly from the estimated relative transformation. If the number of range finders of the network is greater than 2, a more sophisticated approach may be used, which is described in the following.

The parameters estimated in block 320 only relate to pairs of range finders relative to each other. In order to properly initialize the optimization problem, these relative transformations are combined. In a quite simple approach, the optimization graph could be computed from the overlapping areas of the range finders by chaining the transformations along their minimum spanning tree. However, errors typically accumulate while chaining the transformations, potentially resulting in poor point correspondences between the measured points.

Hence, the maximum likelihood configuration of poses of all range finders is aimed at. To achieve this, a factor graph serving as a basis for optimization is constructed.

Referring to Figure $_4$, an example factor graph using pose-to-pose measurements is shown. The factor graph is constructed for four range finders, for example, as shown in FIG. 1. In the graph of Figure $_4$, the poses of the range finders are shown as $x_1$, $x_2$, $x_3$, $x_4$. The factors z with respective indices denote the relative transformations determined in block 330. Hence, each node represents the location of one of the range finders and each factor represents the transformation estimated before, e.g., with the RANSAC-based algorithm.

More formally, let be $x_i$, $x_j$, $z_{i,j} \in SE(2)$ as defined in the Lie Algebra, where $x_i$, $x_j$ are the poses of the i-th and j-th range finder and $z_{i,j}$ is their relative transformation estimated before. The transformation uncertainties may be scaled by the inverse of the numbers of inliers computed in block 330 or by another quality measure determined during determination of the estimated relative transformation. Hence, transformations that have more support from the inlier set have a higher weight during the optimization.

For example, it is solved for the initial global alignment by minimizing the following least squares problem:

$$(x_1, \ldots, x_N)^* = \mathrm{argmin}_{x_1, \ldots, x_N} \Sigma_{z_{i,j}} \|(x_j \ominus x_i) - z_{i,j}\|^2_{\Omega_{i,j}},$$

where N denotes the number of range finders of the network and $\Omega_{i,j}$ denotes the information matrix associated with the measurement $z_{i,j}$. This information matrix $\Omega_{i,j}$, i.e., the quality measure, corresponds to a weighting of the cost function, which however may be left out if, for example, computational resources are limited.

The result of the minimization $(x_1, \ldots, x_N)^*$ can be used as an initial guess for the poses of all of the range finders in a following iterative optimization process.

Referring back to FIG. 3, blocks 350, 360 and 370 form the iterative optimization process for finding the maximum likelihood configuration of all poses.

For example, in block 350 sets of point correspondences out of the identified data sets are determined, wherein each point correspondence is defined between points in each of the pairs of overlapping range finders, if a distance of said points in said pair is below a threshold. During the iteration, the threshold is redefined decreasingly for each of the iteration steps.

In block 360 a maximum likelihood configuration of poses of all of the range finders of the network is determined based on the sets of point correspondences determined for the present iteration step. The determination is further based on the maximum likelihood configuration determined in the previous iteration step or, in a first iteration step, on the initial maximum likelihood configuration determined in block 340.

In block 370 it is checked whether a convergence criterion is reached. In particular, a further iteration is started by returning to block 350, if the convergence criterion is not reached.

To this end a global optimization problem is constructed, in which all point correspondences for all pairs of range finders and all time stamps is included. For example, each point correspondence can be regarded as a landmark, observed from two different range finders at one specific time.

Figure 5:
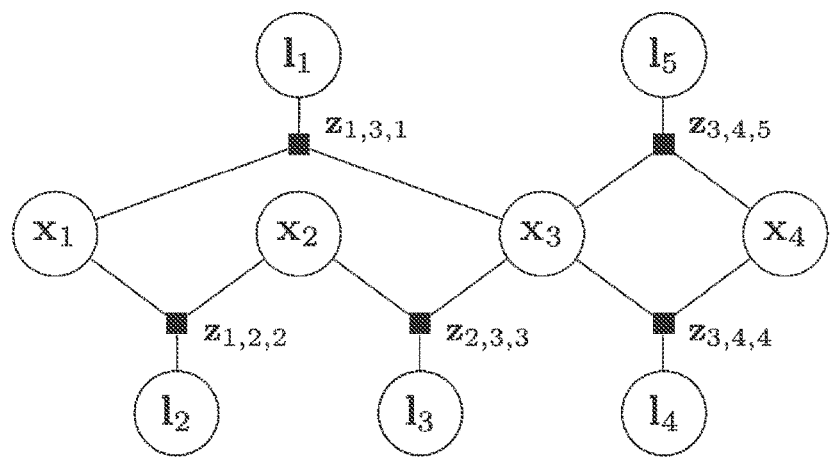
FIG. 5 shows a further example factor graph.

Another factor graph is built, similar to that described in conjunction with block 340. Referring now to FIG. 5, an example of such a further factor graph is shown. The graph of FIG. 5 includes additional nodes to model the point correspondences observed by the range finders, in particular relating to the moving object. Accordingly, each factor expresses the spatial relationship between the poses of two range finders and a jointly observed landmark. As can be seen from FIG. 5, each pair of poses in the graph can have multiple edges between each other, see for instance the nodes $x_3$, and $x_4$. In FIG. 5 the landmarks $l_1$ to $l_5$ implicitly provide measurements $z_{i,j}$, denoted as black squares, between poses $x_i$ of the range finders.

It should be noted that these landmarks are neither distinctive features nor come from static observations since only points corresponding to the moving object are observed. Therefore, there is no re-observation of landmarks in a second time instance.

Given an initial guess, the factor graph is built as following. For each pair of range finders i and j, the measured points in the sets $P_i$ and $P_j$ are expressed in the local coordinate frames of their corresponding range finder. Then, for each time stamp t, points $p_{i,q}^t$ and $p_{j,r}^t$ are associated as a point correspondence $(p_{i,q}^t, p_{j,r}^t)$, if their Euclidian distance is below a threshold. For each associated point a landmark node ll is inserted in the graph and its associated factor $Z_{i,j,l}$.

In some implementations also an angular orientation of each point can be taken into account. For example, for each point a local surface approximation is computed and a corresponding normal direction at this point is stored. The association condition is further extended, if an angular distance between the two points, i.e., their normal directions, is below a given threshold. For example, a point correspondence is not established if the object is observed from different directions, resulting in different points.

For each point correspondence $<p_{i,q}^t, p_{j,r}^t>$ it is looked for the configuration of poses $x_i$, $x_j$ that minimizes the re-projection error $$z_{i,j,l} = p_{i,q} - (x_j \ominus x_i) \oplus p_{j,r},$$

where q and r are the point indices associated with the l-th landmark. It should be noted that a time index is omitted for notational simplicity. To compute the maximum likelihood calibration parameters $(x_1, \ldots, x_N)^*$, the least squares problem $$(x_1, \ldots, x_N)^* = \mathrm{argmin}_{x_1, \ldots, x_N} \Sigma_{z_{i,j,l}} \|z_{i,j,l}\|_{\Omega_{i,j,l}}^2$$

is solved. Similar as in the minimization equation above, $\Omega_{i,j,l}$ denotes the information matrix associated with the measurement $z_{i,j,l}$. This process is iteratively repeated while decreasing the distance thresholds for point correspondences with each iteration.

When the optimization problem converges (decision 370) the resulting poses can be used as calibrated data sets for operation of the network of range finders.

However, it is also possible to perform a final refinement step, in which also the observations from the static analysis of block 300 is included in block 380.

A further aspect of the calibration method according to the improved concept may be to provide a user with a measure of how reliable the resulting calibration is. Such a measure can be provided by employing a consistency check in block 390, for example. For example, in this consistency check observations taken at different times from the same pose may be handled. This may be achieved by including an exterior loop in the algorithm, where the consistency measure is computed on each time stamp. Finally, the consistency value is computed for each pair of range finders by projecting the measurement of one range finder into the coordinate frame of the other and computing the ratio between the number of consistent observations vs. the number of total observations. This may provide a more intuitive measure to non-expert users. The transformations with the lowest consistency value may be visualized together with the estimated overlapping area.

In some specific implementations of a network of range finders it may also be expedient to consider a time component for the extrinsic parameters of the individual range finders. For example, creating a sensor network of range finders to cover large areas might require the use of different types of range finders or connection methods of the range finders to a processing unit. For example, the range finders could be connected by a USB connection, a serial connection or some kind of network connection like Ethernet. This could introduce a time delay in a data stream of each of the range finders due to the serialization of the data and the transmitting medium.

If the respective range finders do not introduce a time stamping of the respective measurement messages before such a delay is introduced but only after the delay has happened, it may be necessary to estimate the individual delay of each range finder. According to a development of the improved concept, the observations of the moving object during the calibration measurement may be used to estimate the differences between the time delays. In other words, in addition to the previously discussed extrinsic parameters of transitional and rotational offset also a time offset of each of the range finders can be determined in a joint calibration.

Referring back to FIG. 3, block 350 related to the determination of point correspondences may be extended by a time component. For example, a global optimization problem without point correspondences of all range finder pairs and all time stamps is formulated. Each correspondence is an observation made of two of the range finders at the same time instance t. Since also the time offset is calibrated in such an implementation, the assumption that both observations were made at exactly the same time is relaxed. Instead, the sensor observations are interpolated to a common time t.

For example, determining the sets of point correspondences further comprises calculating a velocity vector of each point, wherein the distance of said points in said pair of range finders is further defined by a time distance of said points. The time distance is determined based on the respective velocity vectors.

As described before, e.g., a factor graph from the previously computed initial guess is created. For each range finder the measured point is expressed in a set P which contains the measured points in the local coordinate frame, a velocity vector and, preferably, a local surface normal approximation, as described above. $P_i$ is the set of points of sensor i and the point $p_{i,q}^t$ is the q-th point at the time t of sensor i.

Points of the sensors i and j are associated if not only the Euclidian distance, but also a time distance and, preferably, an angular distance is below a given threshold defined for each iteration step. For each point pair $<p_{i,q}^{t_a}, p_{j,h}^{t_b}>$ an interpolation to time t is defined by $$\hat{p}_{i,q}^t = p_{i,q}^{t_a} + v_{i,q}^{t_a} * (t - (t_a + \Delta t_i))$$

$$\hat{p}_{j,r}^t = p_{j,r}^{t_b} + v_{j,r}^{t_b} * (t - (t_b + \Delta t_j))$$

$$t = \frac{t_a + \Delta t_i}{2} + \frac{t_b + \Delta t_j}{2}$$

with $v_{i,q}^{t_a}$ and $v_{j,r}^{t_b}$ representing the velocity vector of $p_{i,q}^{t_a}$ and $p_{j,r}^{t_b}$ at time $t_a$ and $t_b$. The time offsets of each of the range finders i and j are $\Delta t_i$ and $\Delta t_j$.

The configuration of poses $x_i$ and $x_j$ and time offsets $\Delta t_i$, $\Delta t_j$ is searched for all correspondences $<p_{i,q}^{t_a}, p_{j,r}^{t_b}>$ that minimizes the re-projection error $$z_{i,j,l} = \hat{p}_{i,q}^t - (x_j \ominus x_i) \oplus \hat{p}_{j,r}^t,$$

where $<\hat{p}_{i,q}^t, \hat{p}_{j,r}^t>$ are the projections of $<p_{i,q}^{t_a}, p_{j,r}^{t_b}>$ associated with the l-th landmark. To compute the maximum likelihood calibration parameters $(x_1, \ldots, x_N, \Delta t_1, \ldots, \Delta t_N)^*$ for all poses and all time offsets, the following least squares problem is solved:

$$(x_1, \ldots, x_N, \Delta t_1, \ldots, \Delta t_N)^* = \mathop{\mathrm{argmin}}_{x_1, \ldots, x_N, \Delta t_1, \ldots, \Delta t_N} \sum_{z_{i,j,l}} \|z_{i,j,l}\|_{\Omega_{i,j,l}}^2$$

As in the previous equations, $\Omega_{i,j,l}$ denotes the information matrix associated with the measurement $z_{i,j,l}$.

As described before without considering the time component, this process is iteratively repeated with a decreasing distance threshold for the point correspondences. Again, after the optimization problem converged, a final refinement step can be performed in which also the observations from the static analysis can be included.

Finally, the optimized set of poses and time offsets of the network of range finders can be used to operate the network of range finders in a productive mode of operation.

Figure 6A:
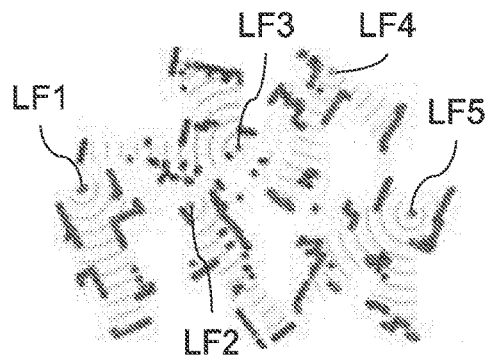
FIG. 6A and FIG. 6B show setups of range finders before and after calibration.
Figure 6B:
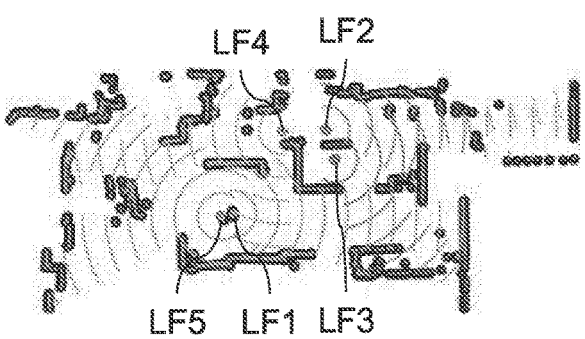

FIG. 6A and FIG. 6B show an example of the application of the calibration method according to the improved concept on a network of five laser range finders LF1 to LF5. FIG. 6A shows an uncalibrated combined view of the five laser range finders with the range finders marked as dots, the field of view of the individual laser range finders marked with wave fronts, and with the remaining parts being static obstacles such as walls or the like.

FIG. 6B shows a combined view after calibration of the range finders of FIG. 6A. Accordingly, with the calibrated network, each object, static or dynamic, can be identified within a common coordinate frame for the complete network.

The invention claimed is:

1. A method for calibrating a network of multiple horizontally scanning range finders, wherein each of the range finders has a scanning range that is overlapping with a scanning range of at least one of the other range finders, the method comprising:
performing a measurement with the range finders during a movement of an object through an area covered by the network of range finders;
identifying, for each range finder, data sets of the measurement associated with the moving object, based on a static analysis of the respective range finder;
for each pair of overlapping range finders of the network of range finders, determining an estimated relative transformation between respective poses of the pair of range finders, based on the identified data sets of the pair of range finders;
determining an initial maximum likelihood configuration of poses of all of the range finders of the network based on the estimated relative transformations of each pair; and
iteratively determining sets of point correspondences of the identified data sets, wherein each point correspondence is defined between points in each of the pairs of range finders, if a distance of the points in the pair of range finders is below a threshold, the threshold being redefined decreasingly for each iteration steps; and
determining a maximum likelihood configuration of poses of all of the range finders of the network based on the sets of point correspondences determined for a present iteration step and either a maximum likelihood configuration determined in a previous iteration step or the initial maximum likelihood configuration of a first iteration step, until a convergence criterion is reached.

2. The method according to claim 1, wherein determining the estimated relative transformation comprises determining the estimated relative transformation based on a Random Sample Consensus (RANSAC) based algorithm for each pair of overlapping range finders.

3. The method according to claim 1, wherein the estimated relative transformation is determined for each pair of overlapping range finders by iteratively:
calculating a hypothetic relative transformation based on one of the identified data sets each of this pair at a given time instance;
applying the calculated hypothetic relative transformation on the remaining identified data sets at the given time instance;
counting the number of data sets fulfilling a threshold error condition after application of the calculated hypothetic relative transformation; and
using the hypothetic relative transformation with the highest counted number as the estimated relative transformation.

4. The method according to claim 1, wherein the initial maximum likelihood configuration of poses is determined by minimizing a cost function, the cost function being defined by a pose difference of poses of each one of the pairs of range finders in relation to the estimated relative transformation of the pair.

5. The method according to claim 4, wherein determining the initial maximum likelihood configuration of poses further comprises weighting of the cost function based on a quality measure determined during determination of the estimated relative transformation.

6. The method according to claim 4, wherein the cost function is minimized based on a Least Squares approach.

7. The method according to claim 1, wherein the distance of the points in the pair of range finders is defined as an Euclidian distance of points in a coordinate system common to the pair.

8. The method according to claim 7, wherein determining the sets of point correspondences further comprises calculating an angular orientation of each point, and wherein the distance of the points in the pair of range finders is further defined by an angular distance of orientation of the points.

9. The method according to claim 7, wherein determining the sets of point correspondences further comprises calculating a velocity vector of each point, and wherein the distance of the points in the pair of range finders is further defined by a time distance of the points, the time distance being determined based on the respective velocity vectors.

10. The method according to claim 9, further comprising for each of the iteration steps, commonly determining the maximum likelihood configuration of poses together with a maximum likelihood configuration of time offsets of all of the range finders of the network, wherein the maximum likelihood configuration of poses and time offsets is determined by minimizing a cost function, the cost function being defined by a re-projection error in a projection of the point correspondences determined for the present iteration step as a function of either the maximum likelihood configuration of poses and time offsets determined in the previous iteration step or, in a first iteration step, the initial maximum likelihood configuration.

11. The method according to claim 10, wherein for each of the iteration steps determining the maximum likelihood configuration further comprises weighting of the cost function based on a quality measure determined during determination of the estimated relative transformation.

12. The method according to claim 1, wherein for each of the iteration steps the maximum likelihood configuration of poses is determined by minimizing a cost function, the cost function being defined by a re-projection error in a projection of the point correspondences determined for the present iteration step as a function of either the maximum likelihood configuration of poses determined in the previous iteration step or, in a first iteration step, the initial maximum likelihood configuration.

13. The method according to claim 12, wherein for each of the iteration steps determining the maximum likelihood configuration further comprises weighting of the cost function based on a quality measure determined during determination of the estimated relative transformation.

14. The method according to claim 12, wherein for each of the iteration steps the cost function is minimized based on a Least Squares approach.

15. The method according to claim 1, wherein the maximum likelihood configuration determined in a last iteration step is further refined based on the static analysis of the range finders.

16. The method according to claim 1, wherein the static analysis of each of the range finders comprises an estimation of a static part of an environment covered by the scanning range of the respective range finder, using background subtraction techniques.

17. The method according to claim 1, wherein each of the poses defines a translation in a two-dimensional coordinate system together with a rotational component.

18. The method according to claim 17, wherein the translation and the rotational component are related to an origin and an orientation of a common coordinate system of all of the range finders.

19. The method according to claim 1, wherein each of the range finders is of a two-dimensional range finder type.

20. A calibration system for a network of multiple horizontally scanning range finders, wherein each range finder has a scanning range that is overlapping with a scanning range of at least one of the other range finders, the calibration system comprising:

a processing unit configured to:

perform a measurement with the range finders during a movement of an object through an area covered by the network of range finders;

identify, for each of the range finders, data sets of the measurement associated with the moving object, based on a static analysis of the respective range finder;

determine, for each pair of overlapping range finders out of the network of range finders, an estimated relative transformation between respective poses of the range finders of the pair, based on the identified data sets of the range finders of the pair;

determine an initial maximum likelihood configuration of poses of all of the range finders of the network based on the estimated relative transformation of each pair; and iteratively determine sets of point correspondences out of the identified data sets, wherein each point correspondence is defined between points in each of the pairs of overlapping range finders, if a distance of the points in the pair is below a threshold, the threshold being redefined decreasingly for each iteration step; and determine a maximum likelihood configuration of poses of all of the range finders of the network based on the sets of point correspondences determined for a present iteration step and either the maximum likelihood configuration determined in a previous iteration step or, the initial maximum likelihood configuration of a first iteration step, until a convergence criterion is reached.

* * * * *